(12) United States Patent
Ichikawa

(10) Patent No.: US 10,457,149 B2
(45) Date of Patent: Oct. 29, 2019

(54) CONTACTLESS POWER TRANSFER SYSTEM AND POWER TRANSMISSION DEVICE

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 15/038,344

(22) PCT Filed: Nov. 25, 2014

(86) PCT No.: PCT/JP2014/081021
§ 371 (c)(1),
(2) Date: May 20, 2016

(87) PCT Pub. No.: WO2015/083573
PCT Pub. Date: Jun. 11, 2015

(65) Prior Publication Data
US 2016/0311337 A1 Oct. 27, 2016

(30) Foreign Application Priority Data
Dec. 5, 2013 (JP) .................................. 2013-252149

(51) Int. Cl.
*B60L 53/12* (2019.01)
*B60L 11/18* (2006.01)
(Continued)

(52) U.S. Cl.
CPC ............... *B60L 11/18* (2013.01); *B60L 50/50* (2019.02); *B60L 53/12* (2019.02); *B60L 53/122* (2019.02);
(Continued)

(58) Field of Classification Search
CPC .............. B60L 11/1838; B60L 11/1829; B60L 11/182; B60L 2250/16; B60L 2230/16;
(Continued)

(56) References Cited

U.S. PATENT DOCUMENTS 7,741,734 B2 6/2010 Joannopoulos et al.
9,484,881 B2 * 11/2016 Suzuki ..................... H03H 7/40
(Continued)

FOREIGN PATENT DOCUMENTS

AU 2006269374 B2 1/2007
AU 2007349874 A2 10/2008
(Continued)

*Primary Examiner* — Richard Isla
*Assistant Examiner* — Manuel Hernandez
(74) *Attorney, Agent, or Firm* — Oliff PLC

(57) ABSTRACT

A power reception unit includes a resonance circuit for contactlessly receiving electric power output from power transmission units. Each of the power transmission units is configured to be able to form a plurality of resonance circuits having circuit configurations different from each other. A communication unit transmits information about a configuration of the resonance circuit of the power reception unit to a communication unit. A power supply ECU controls the power transmission units such that a resonance circuit of the plurality of resonance circuits which has a circuit configuration identical to that of the resonance circuit of the power reception unit is formed in the power transmission units.

4 Claims, 9 Drawing Sheets

(51) Int. Cl.
    *H02J 50/90*     (2016.01)
    *H02J 50/40*     (2016.01)
    *B60L 53/122*     (2019.01)
    *H02J 5/00*     (2016.01)
    *H02J 7/02*     (2016.01)
    *H02J 50/12*     (2016.01)
    *H02J 50/80*     (2016.01)
    *B60L 50/50*     (2019.01)
    *B60L 53/38*     (2019.01)
    *B60L 53/30*     (2019.01)

(52) U.S. Cl.
    CPC ............ *B60L 53/305* (2019.02); *B60L 53/38* (2019.02); *H02J 5/005* (2013.01); *H02J 7/025* (2013.01); *H02J 50/12* (2016.02); *H02J 50/40* (2016.02); *H02J 50/80* (2016.02); *H02J 50/90* (2016.02); *B60L 2250/16* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01)

(58) Field of Classification Search
    CPC ........ B60L 53/122; B60L 53/12; B60L 53/38; H02J 50/90; H02J 50/40; H02J 50/80; H02J 50/12; H02J 5/005; H02J 7/025; Y02T 90/128; Y02T 90/14; Y02T 90/121; Y02T 90/163; Y02T 90/125; Y02T 90/16; Y02T 90/122; Y02T 10/7088; Y02T 10/7005
    USPC .......................................... 320/108; 307/104
    See application file for complete search history.

(56) References Cited

U.S. PATENT DOCUMENTS

| | | | |
|---|---|---|---|
| 2007/0222542 A1 | 9/2007 | Joannopoulos et al. | |
| 2008/0197802 A1 | 8/2008 | Onishi et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0237709 A1* | 9/2010 | Hall ...................... | B60L 11/182 307/104 |
| 2010/0253152 A1 | 10/2010 | Karalis et al. | |
| 2010/0264745 A1 | 10/2010 | Karalis et al. | |
| 2010/0312310 A1* | 12/2010 | Meskens ............... | A61N 1/3787 607/61 |
| 2011/0248572 A1 | 10/2011 | Kozakai et al. | |
| 2012/0293118 A1 | 11/2012 | Kim et al. | |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |

FOREIGN PATENT DOCUMENTS

| | | | |
|---|---|---|---|
| AU | 2010200044 A1 | 1/2010 | |
| AU | 2006269374 C1 | 3/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| IN | 735/DELNP/2008 | 5/2008 | |
| IN | 6195/DELNP/2009 | 7/2010 | |
| JP | H11-188113 A | 7/1999 | |
| JP | 2008-206233 A | 9/2008 | |
| JP | 2009-501510 A | 1/2009 | |
| JP | 2011-223739 A | 11/2011 | |
| JP | 2013-110822 A | 6/2013 | |
| JP | 2013-126327 A | 6/2013 | |
| JP | 2013-146148 A | 7/2013 | |
| JP | 2013-146154 A | 7/2013 | |
| JP | 2013-154815 A | 8/2013 | |
| JP | 2013-219899 A | 10/2013 | |
| JP | 2015139345 A * | 7/2015 | |
| KR | 2008-0031398 A | 4/2008 | |
| KR | 2010-0015954 A | 2/2010 | |
| WO | 2007/008646 A2 | 1/2007 | |
| WO | 2008/118178 A1 | 10/2008 | |

\* cited by examiner

CONTACTLESS POWER TRANSFER SYSTEM AND POWER TRANSMISSION DEVICE

TECHNICAL FIELD

The present invention relates to a contactless power transfer system. In particular, the present invention relates to a contactless power transfer system configured to contactlessly transfer electric power from a charging station to a vehicle, and a power transmission device used therefor.

BACKGROUND ART

Japanese Patent Laying-Open No. 2011-223739 (PTD 1) discloses a wireless power feeding system configured to contactlessly transfer electric power from a power feeding device to a power reception device. In the wireless power feeding system, the power feeding device includes a power transmission element to which electric power generated by a power generation unit is supplied, and a first variable matching unit which includes an impedance matching function at a power feeding point of the power transmission element. The power reception device includes a power reception element which receives electric power transmitted through a magnetic field resonance relation, and a second variable matching unit which includes an impedance matching function at a connection portion with a load of the power transmission element. According to the wireless power feeding system, impedance adjustment on both the power transmission side and the power reception side can be performed by the first and second variable matching units (see PTD 1).

CITATION LIST

Patent Document

PTD 1: Japanese Patent Laying-Open No. 2011-223739
PTD 2: Japanese Patent Laying-Open No. 2013-219899
PTD 3: Japanese Patent Laying-Open No. 2013-154815
PTD 4: Japanese Patent Laying-Open No. 2013-146154
PTD 5: Japanese Patent Laying-Open No. 2013-146148
PTD 6: Japanese Patent Laying-Open No. 2013-110822
PTD 7: Japanese Patent Laying-Open No. 2013-126327

SUMMARY OF INVENTION

Technical Problem

It has been considered to apply a wireless power feeding system as described above to a contactless power transfer system configured to contactlessly transfer electric power from a charging station to a vehicle.

In each of a power transmission unit of the charging station and a power reception unit of the vehicle, a resonance circuit may be used to improve power transfer efficiency. For the configuration of the resonance circuit, a plurality of types have been proposed, including a type in which a capacitor is connected in series with a coil (hereinafter referred to as an "S" (Series) configuration), a type in which a capacitor is connected in parallel with a coil (hereinafter referred to as a "P" (Parallel) configuration), a type in which a capacitor is further connected in series with a circuit having the P configuration (hereinafter referred to as an "SP" configuration), a type in which a capacitor is further connected in parallel with a circuit having the S configuration (hereinafter referred to as a "PS" configuration), and the like.

In a case where the power transmission unit and the power reception unit have resonance circuits having different configurations, when variable matching units as described in PTD 1 are provided, impedance adjustment by the variable matching units may become complicated. When the variable matching units are not provided, for example, when LC filters which may serve as fixed matching devices are provided, power transfer efficiency may be significantly reduced due to impedance mismatching between the power transmission side and the power reception side.

The present invention has been made to solve such a problem, and an object of the present invention is to suppress, in a contactless power transfer system configured to contactlessly transfer electric power from a charging station to a vehicle, impedance mismatching between the charging station and the vehicle.

Solution to Problem

According to the present invention, a contactless power transfer system includes a charging station, and a vehicle configured to contactlessly receive electric power from the charging station. The charging station includes a power transmission unit for contactlessly transmitting the electric power to the vehicle, a first communication device configured to communicate with the vehicle, and a control device. The vehicle includes a resonance circuit for power reception configured to contactlessly receive the electric power output from the power transmission unit, and a second communication device configured to communicate with the charging station. The power transmission unit is configured to be able to form a plurality of resonance circuits for power transmission having circuit configurations different from each other. The second communication device transmits information about a configuration of the resonance circuit for power reception to the first communication device. The control device controls the power transmission unit, when the information is received by the first communication device, to form a resonance circuit in the power transmission unit based on the received information.

In the contactless power transfer system, a resonance circuit of the plurality of resonance circuits for power transmission by which more appropriate current-voltage characteristics are obtained can be formed in the power transmission unit, based on the information about the configuration of the resonant circuit for power reception. Therefore, according to the contactless power transfer system, impedance mismatching between the charging station and the vehicle can be suppressed.

Further, according to the present invention, a contactless power transfer system includes a charging station, and a vehicle configured to contactlessly receive electric power from the charging station. The charging station includes a power transmission unit for contactlessly transmitting the electric power to the vehicle, a first communication device configured to communicate with the vehicle, and a control device. The vehicle includes a resonance circuit for power reception configured to contactlessly receive the electric power output from the power transmission unit, and a second communication device configured to communicate with the charging station. The power transmission unit is configured to be able to form a plurality of resonance circuits for power transmission having circuit configurations different from each other. The second communication device transmits information about a configuration of the resonance circuit for power reception to the first communication device. The control device controls the power transmission unit, when the information is received by the first communication device, to form a resonance circuit of the plurality of resonance circuits for power transmission in the power transmission unit, the resonance circuit having a circuit configuration identical to that of the resonance circuit for power reception.

In the contactless power transfer system, the power transmission unit of the charging station and the power reception unit of the vehicle have resonance circuits having an identical circuit configuration. Therefore, according to the contactless power transfer system, impedance mismatching between the charging station and the vehicle due to the difference in the circuit configuration of the resonance circuit between the power transmission unit and the power reception unit can be suppressed.

Preferably, the power transmission unit includes a switching circuit for selectively forming a resonance circuit for power transmission having any of an S configuration, a P configuration, an SP configuration, and a PS configuration.

Advantageous Effects of Invention

According to the present invention, in a contactless power transfer system configured to contactlessly transfer electric power from a charging station to a vehicle, impedance mismatching between the charging station and the vehicle can be suppressed.

DESCRIPTION OF EMBODIMENTS

Figure 1:
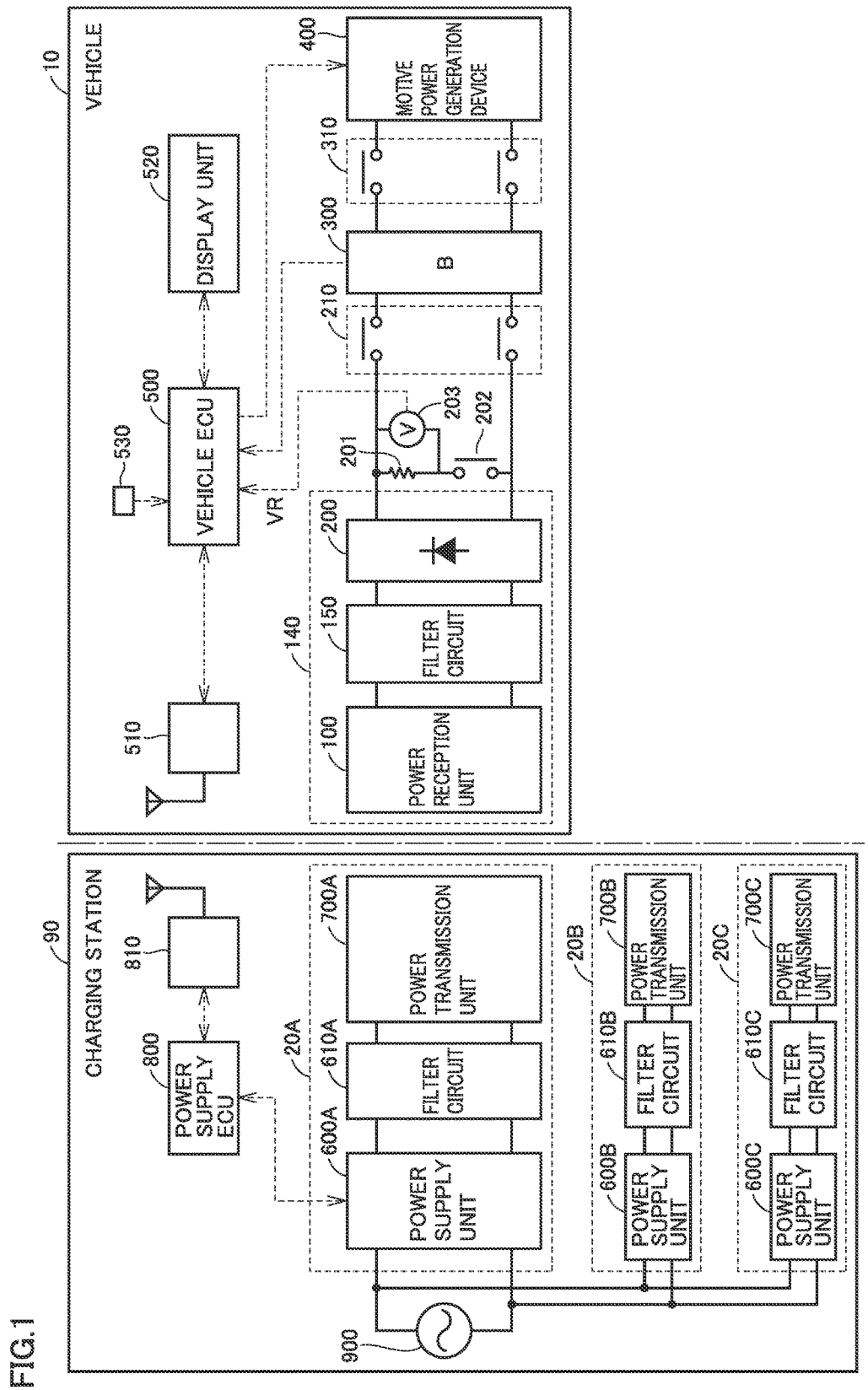
FIG. 1 is an overall configuration diagram of a contactless power transfer system in accordance with an embodiment of the present invention.

Hereinafter, an embodiment of the present invention will be described in detail with reference to the drawings. It should be noted that identical or corresponding parts in the drawings will be designated by the same reference numerals, and the description thereof will not be repeated.

(Description of Outline of Contactless Power Transfer System)

Figure 2:
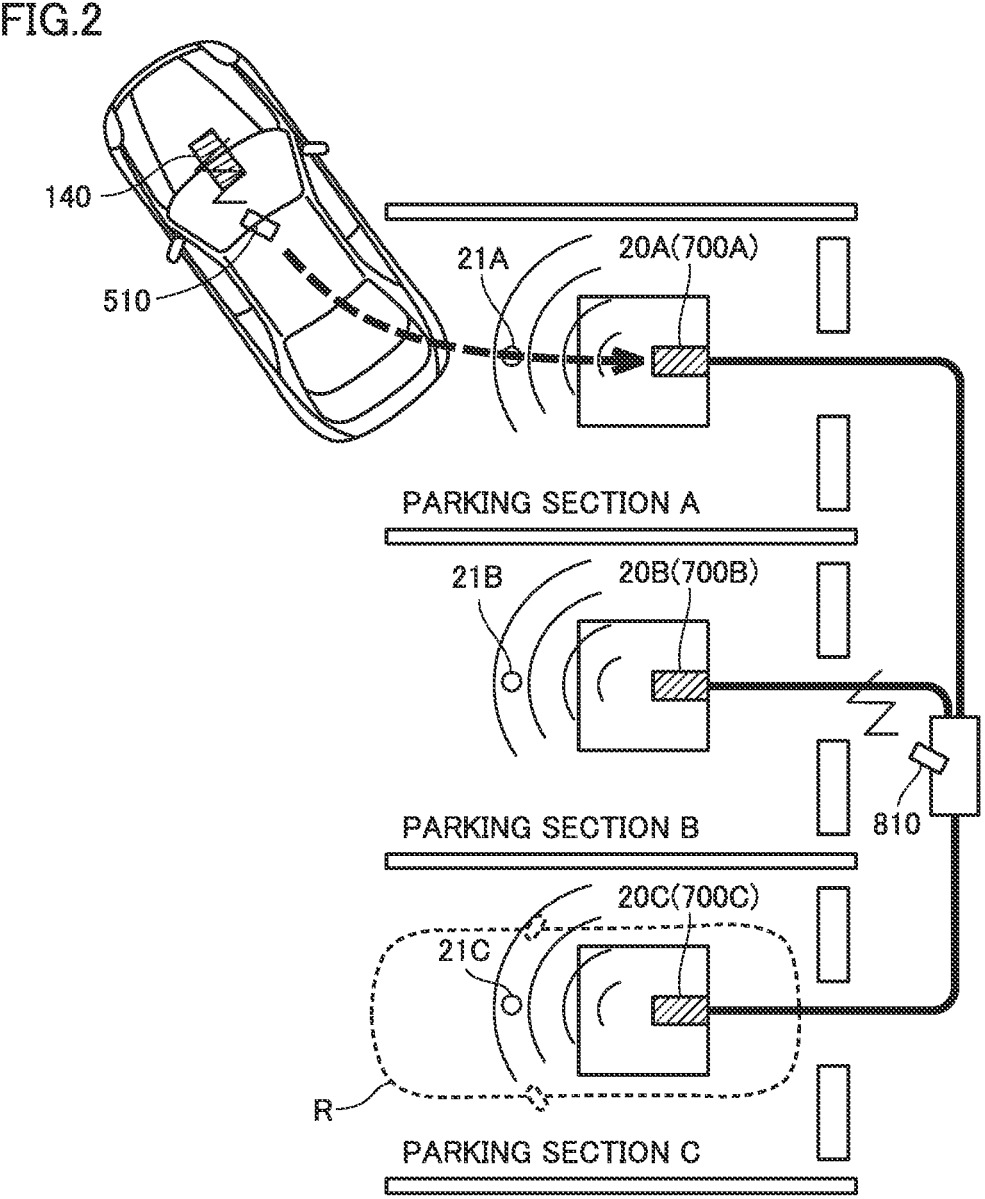
FIG. 2 is a view for illustrating a manner in which a vehicle is being parked at a parking position within a charging station.

FIG. 1 is an overall configuration diagram of a contactless power transfer system in accordance with an embodiment of the present invention. FIG. 2 is a view for illustrating a manner in which a vehicle is being parked at a parking position within a charging station. First, an outline of the present embodiment will be described with reference to FIGS. 1 and 2.

Referring to FIGS. 1 and 2, the contactless power transfer system of the present embodiment includes a vehicle 10 and a charging station 90. Charging station 90 includes a communication unit 810, parking sections A to C, and power transmission units 700A to 700C provided within respective parking sections A to C, respectively. A "vehicle stop region R" in FIG. 2 indicates a region where vehicle 10 is located when vehicle 10 stops such that a power reception unit 100 of vehicle 10 faces any of power transmission units 700A to 700C of charging station 90.

It should be noted that, although FIG. 2 shows the vehicle stop region related to power transmission unit 700C of a power transmission device 20C, as a matter of course, each of power transmission units 700A, 700B of power transmission devices 20A, 20B also has a vehicle stop region.

Communication unit 810 is configured to send a signal to reach inside vehicle stop region R and outside vehicle stop region R. Specifically, the signal sending area of communication unit 810 is in a range with a radius of, for example, 5 to 10 meters centered at communication unit 810.

In other words, communication unit 810 sends a signal to reach not only inside parking sections A to C but also a position several meters away from parking sections A to C. If vehicle 10 is located inside parking sections A to C or within a range of several meters from parking sections A to C, vehicle 10 can receive the signal from charging station 90.

Vehicle 10 includes a communication unit 510 configured to transmit a signal from not only inside the parking sections but also outside parking sections A to C (for example, a position about 5 to 10 meters away from parking sections A to C) to charging station 90 to be received by charging station 90, power reception unit 100 configured to contactlessly receive electric power from power transmission units 700A to 700C, a display unit 520 for informing a user of a relative positional relation between power reception unit 100 and power transmission units 700A to 700C, and a control unit (vehicle ECU 500) configured to control communication unit 510, power reception unit 100, and display unit 520.

Preferably, charging station 90 includes sensors 21A to 21C provided in respective parking sections A to C, respectively. Sensors 21A to 21C detect whether or not there is a vehicle stopping inside parking sections A to C, respectively. When charging station 90 determines that no vehicle stops in at least one of parking sections A to C based on outputs from sensors 21A to 21C, charging station 90 sends a broadcast signal informing that charging station 90 can transmit electric power, to the surroundings. On the other hand, when charging station 90 determines that vehicles stop in all parking sections A to C based on outputs from sensors 21A to 21C, charging station 90 does not send the broadcast signal to the surroundings. Thereby, vehicle 10 is guided into charging station 90 when there is a vacant parking section.

When vehicle 10 receives the broadcast signal from charging station 90, vehicle 10 sends information about a resonance circuit (a concrete configuration thereof will be described later) constituting power reception unit 100 to the surroundings. That is, each of power reception unit 100 and power transmission units 700A to 700C is constituted by a resonance circuit including a coil and a capacitor. Further, each of power transmission units 700A to 700C is configured to be able to form a plurality of resonance circuits having circuit configurations different from each other. When charging station 90 receives the information about the resonance circuit of power reception unit 100, a resonance circuit of the plurality of resonance circuits which has a circuit configuration identical to that of the resonance circuit of power reception unit 100 is formed in a power transmission unit corresponding to a parking section where no vehicle stops. Thereby, the power transmission unit of the parking section into which vehicle 10 is guided and power reception unit 100 of vehicle 10 can have resonance circuits having an identical configuration.

Next, vehicle 10 sends a signal for requesting to output electric power for position check for performing alignment of vehicle 10 relative to the parking section, to the surroundings. It should be noted that the electric power for position check is electric power output from charging station 90 when the alignment of vehicle 10 relative to the parking section is performed, and the alignment of vehicle 10 is performed based on a received voltage obtained when the electric power for position check is received by vehicle 10. It should be noted that the above request signal is sent to reach a range of about 5 to 10 meters centered at vehicle 10. Thereby, even when vehicle 10 is located outside parking sections A to C, charging station 90 can receive the request signal.

When charging station 90 receives the request signal, charging station 90 supplies the electric power for position check to power transmission units 700A to 700C provided inside at least vacant parking sections A to C. Then, vehicle ECU 500 causes display unit 520 to display a positional relation between power reception unit 100 and any of power transmission units 700A to 700C, based on a received voltage VR generated by the electric power received by power reception unit 100. With such a configuration, vehicle 10 can be reliably charged, because power transfer is actually performed between a power transmission unit and the power reception unit and alignment can be performed in accordance with a result thereof.

Preferably, vehicle 10 includes a contactless charging switch 530 to be operated by the user, and, in a case where vehicle 10 receives the broadcast signal when contactless charging switch 530 is ON, vehicle 10 sends the request signal for requesting to output the electric power for position check, to the surroundings. With such a configuration, for example when the user wants to charge the vehicle, the user may turn contactless charging switch 530 ON, and thereby alignment between the power reception unit and a power transmission unit can be performed based on the received voltage.

Preferably, when the alignment between power reception unit 100 and any of power transmission units 700A to 700C of charging station 90 is completed, vehicle ECU 500 performs pairing processing for causing charging station 90 to identify with which of power transmission units 700A to 700C power reception unit 100 is aligned, between vehicle ECU 500 and charging station 90. Through the pairing processing, the power transmission unit with which power reception unit 100 is aligned can be identified, even when the charging station is charging station 90 having the plurality of power transmission units 700A to 700C.

Preferably, the above pairing processing includes processing in which a plurality of patterns of power transmission different from each other are transmitted from power transmission units 700A to 700C, respectively, and power reception unit 100 transmits a signal corresponding to a received pattern of power transmission, from communication unit 510 to communication unit 810.

Figure 9:
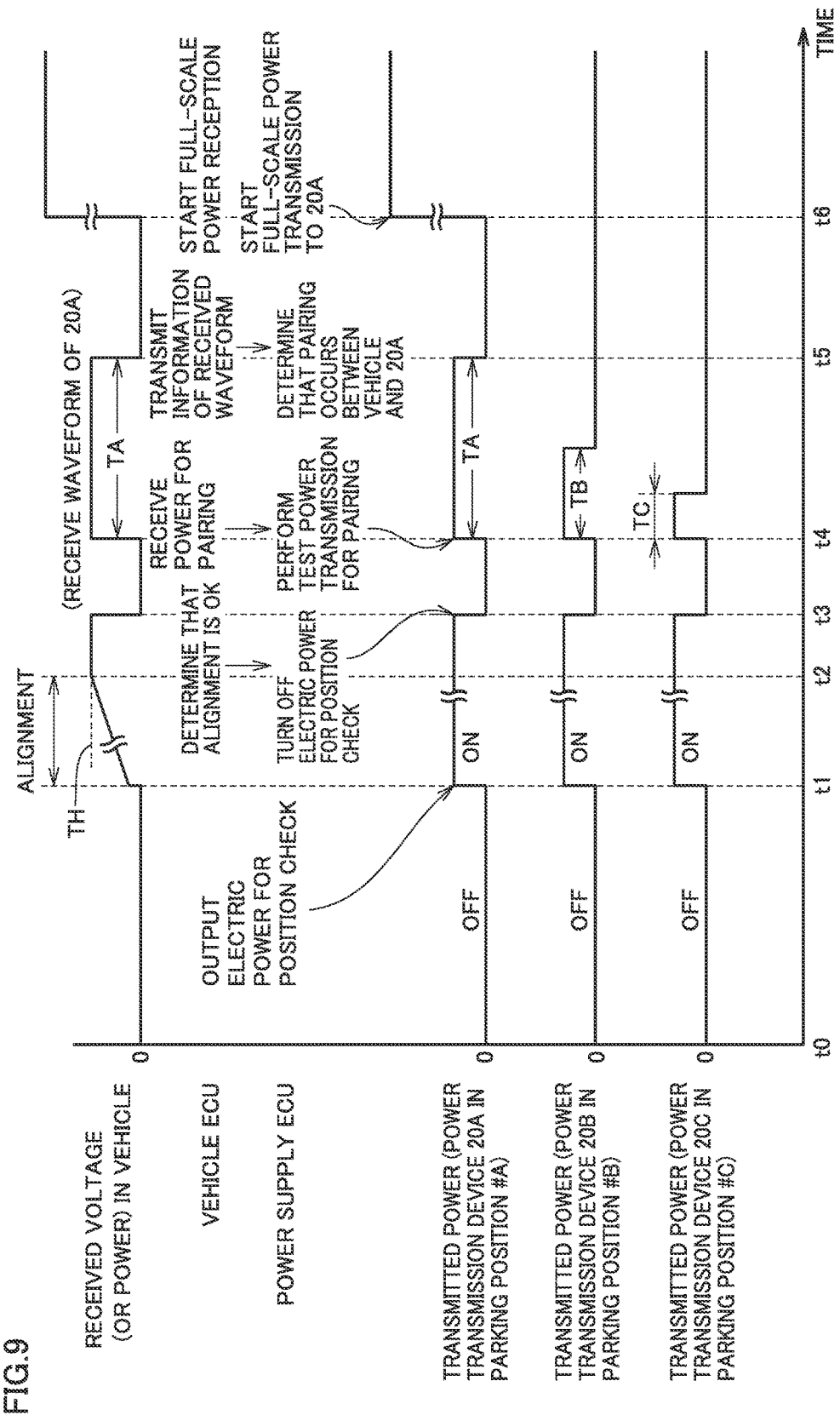
FIG. 9 is a timing chart showing changes in transmitted power and received voltage changing in the course of the processing of FIG. 8.
Figure 12:
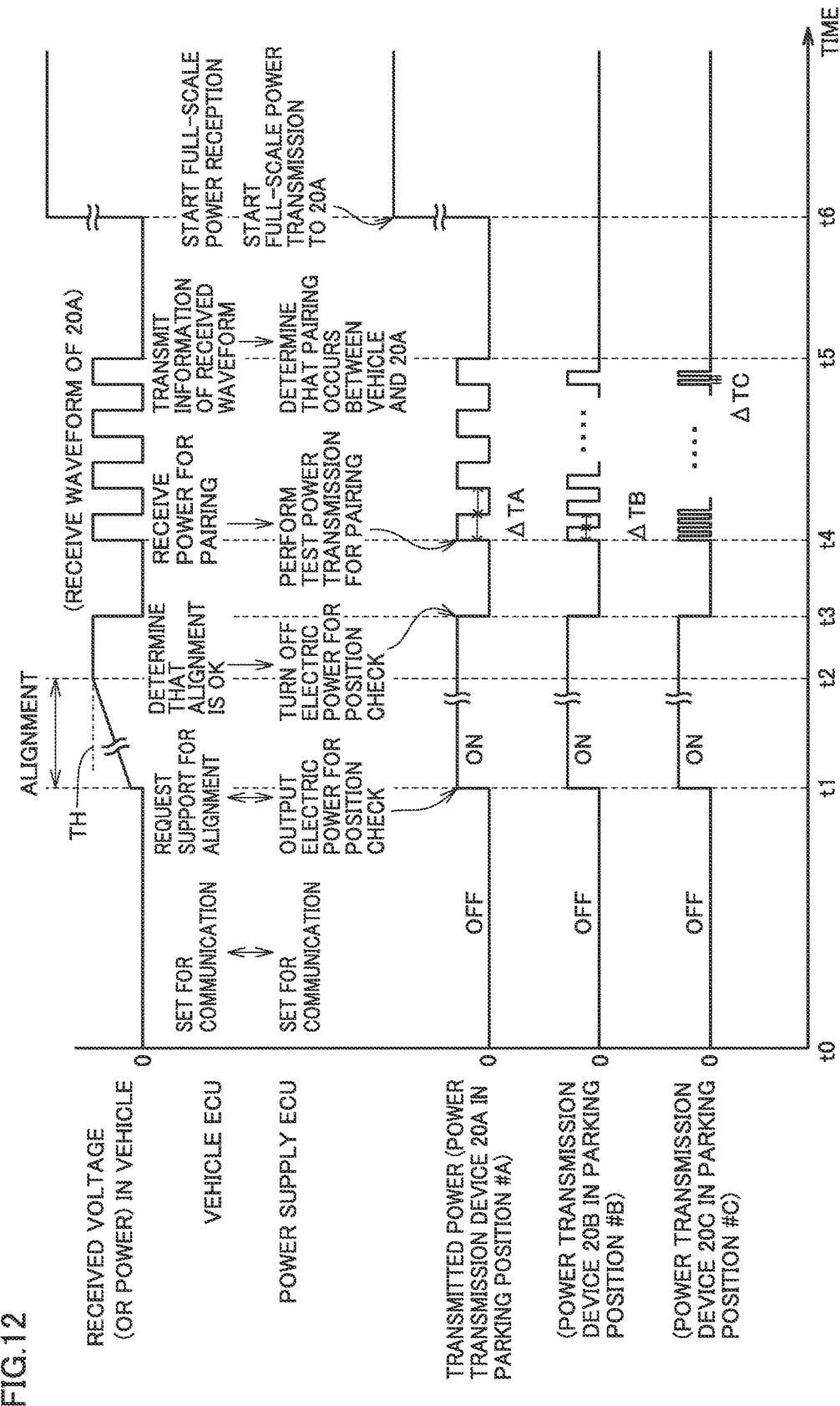
FIG. 12 is a view for illustrating a variation of pairing processing.

More preferably, the plurality of patterns of power transmission are power transmission in which electric power is transmitted for power transmission times different from each other within a predetermined period (FIG. 9). Alternatively, the plurality of patterns of power transmission may be power transmission in which electric power is transmitted to repeat ON and OFF in patterns different from each other within a predetermined period (FIG. 12).

Next, details of the configuration of the contactless power transfer system will be further described.

(Detailed Configuration of Contactless Power Transfer System)

Referring to FIG. 1, the contactless power transfer system of the present embodiment includes vehicle 10 equipped with a power reception device 140 configured to be able to contactlessly receive electric power, and charging station 90 including power transmission devices 20A, 20B, 20C configured to transmit electric power from outside the vehicle to power reception unit 100.

Vehicle 10 includes power reception device 140, a power storage device 300, a motive power generation device 400, vehicle ECU 500, communication unit 510, display unit 520, and contactless charging switch 530. Power reception device 140 includes power reception unit 100, a filter circuit 150, and a rectification unit 200.

Charging station 90 includes an external power source 900, power transmission devices 20A, 20B, 20C, a power supply ECU 800, and communication unit 810. Power transmission devices 20A, 20B, 20C include power supply units 600A, 600B, 600C, filter circuits 610A, 610B, 610C, and power transmission units 700A, 700B, 700C, respectively.

For example, as shown in FIG. 2, power transmission devices 20A, 20B, 20C are provided on or in the ground of parking positions A, B, C, respectively, and power reception device 140 is arranged at a lower part of the body of the vehicle. It should be noted that the location of arranging power reception device 140 is not limited thereto. For example, if power transmission devices 20A, 20B, 20C are provided above vehicle 10, power reception device 140 may be provided at an upper part of the body of the vehicle.

Power reception unit 100 includes a resonance circuit for contactlessly receiving (alternating current: AC) power output from any of power transmission units 700A, 700B, 700C of power transmission devices 20A, 20B, 20C. The resonance circuit is constituted by a coil and a capacitor. The configuration of the resonance circuit will be described later. Power reception unit 100 outputs the received power to rectification unit 200. Rectification unit 200 rectifies the AC power received by power reception unit 100, and outputs the rectified AC power to power storage device 300. Filter circuit 150 is provided between power reception unit 100 and rectification unit 200 to suppress harmonic noise generated during power reception. Filter circuit 150 is constituted by an LC filter including an inductor and a capacitor, for example.

Power storage device 300 is a rechargeable direct current (DC) power source, and is constituted by a secondary battery such as a lithium ion battery or a nickel-hydrogen battery, for example. Power storage device 300 has a voltage of about 200 V, for example. Power storage device 300 stores the electric power output from rectification unit 200, and also stores electric power generated by motive power generation device 400. Power storage device 300 supplies the stored electric power to motive power generation device 400. It should be noted that a large-capacity capacitor can also be adopted as power storage device 300. Although not shown in particular, a DC-DC converter for adjusting an output voltage of rectification unit 200 may be provided between rectification unit 200 and power storage device 300.

Motive power generation device 400 generates a traveling drive force for vehicle 10 using the electric power stored in power storage device 300. Although not shown in particular, motive power generation device 400 includes, for example, an inverter which receives the electric power from power storage device 300, a motor driven by the inverter, drive wheels driven by the motor, and the like. It should be noted that motive power generation device 400 may include a power generator for charging power storage device 300, and an engine which can drive the power generator.

Vehicle ECU 500 includes a CPU (Central Processing Unit), a storage device, an input/output buffer, and the like (which are not shown), performs input of signals from various sensors and output of control signals to apparatuses, as well as performs control of apparatuses in vehicle 10. As an example, vehicle ECU 500 performs control of traveling of vehicle 10, and control of charging of power storage device 300. Further, vehicle ECU 500 transmits the information about the resonance circuit of power reception unit 100 to charging station 90, through communication unit 510. These controls can be processed not only by software but also by dedicated hardware (electronic circuitry).

It should be noted that a relay 210 is provided between rectification unit 200 and power storage device 300. Relay 210 is turned ON by vehicle ECU 500 when power storage device 300 is charged by power transmission devices 20A, 20B, 20C. Further, a system main relay (SMR) 310 is provided between power storage device 300 and motive power generation device 400. SMR 310 is turned ON by vehicle ECU 500 when activation of motive power generation device 400 is requested. Furthermore, a resistor 201 is provided between a pair of the power lines between rectification unit 200 and relay 210, and a relay 202 is connected in series with resistor 201. Voltage VR across resistor 201 is detected by a voltage sensor 203, and is transmitted to vehicle ECU 500.

It should be noted that vehicle ECU 500 communicates with communication unit 810 of charging station 90 using communication unit 510, to transmit the information about the resonance circuit constituting power reception unit 100 to charging station 90, and to exchange information about start/stop of power transfer, a power reception condition of vehicle 10, and the like with power supply ECU 800.

Referring to FIGS. 1 and 2, vehicle 10 or charging station 90 determines whether power reception unit 100 of vehicle 10 is aligned with power transmission unit 700A of power transmission device 20A, based on a vehicle-mounted camera not shown, the intensity of the electric power for position check output from power transmission unit 700A and received in vehicle 10, and the like, and informs the user of the determination through display unit 520. Based on the information obtained through display unit 520, the user moves vehicle 10 such that the positional relation between power reception device 140 and power transmission device 20A is suitable for power reception and transmission. It should be noted that the user does not necessarily have to operate a steering wheel or an accelerator, and vehicle 10 may move automatically for alignment and the user may watch movement of vehicle 10 through display unit 520. It should be noted that, instead of being informed through display unit 520 which visually informs the user of the information, the user may be audibly informed of the information.

Referring to FIG. 1 again, in charging station 90, power supply units 600A, 600B, 600C receive electric power from external power source 900 such as a commercial system power source, to generate AC power having a predetermined transfer frequency.

Each of power transmission units 700A, 700B, 700C is configured to be able to form the plurality of resonance circuits having circuit configurations different from each other. Each power transmission unit includes a coil and a capacitor, and switching means for switching the circuit configurations of the resonance circuits by switching connection configurations between the coil and the capacitor. The configuration of each power transmission unit will be described later. Power transmission units 700A, 700B, 700C receive the AC power having the transfer frequency from power supply units 600A, 600B, 600C, respectively, and contactlessly transmit the AC power to power reception unit 100 of vehicle 10, via electromagnetic fields generated around power transmission units 700A, 700B, 700C.

Filter circuits 610A, 610B, 610C are provided between power supply units 600A, 600B, 600C and power transmission units 700A, 700B, 700C to suppress harmonic noise generated from power supply units 600A, 600B, 600C. Filter circuits 610A, 610B, 610C are each constituted by an LC filter including an inductor and a capacitor.

Power supply ECU 800 includes a CPU, a storage device, an input/output buffer, and the like (which are not shown), performs input of signals from various sensors and output of control signals to apparatuses, as well as performs control of apparatuses in charging station 90. As an example, power supply ECU 800 performs control of switching of power supply units 600A, 600B, 600C such that power supply units 600A, 600B, 600C generate the AC power having the transfer frequency.

Furthermore, as a main control performed by power supply ECU 800, when power supply ECU 800 receives the information about the resonance circuit constituting power reception unit 100 of vehicle 10 from vehicle 10 through communication unit 810, power supply ECU 800 controls power transmission units 700A to 700C such that a resonance circuit of the plurality of resonance circuits which has a circuit configuration identical to that of the resonance circuit of power reception unit 100 is formed in a power transmission unit corresponding to a parking section where no vehicle stops. It should be noted that these controls can be processed not only by software but also by dedicated hardware (electronic circuitry).

It should be noted that power supply ECU 800 communicates with communication unit 510 of vehicle 10 using communication unit 810, to receive the information about the resonance circuit constituting power reception unit 100 from vehicle 10, and to exchange information about start/stop of power transmission, the power reception condition of vehicle 10, and the like with vehicle 10.

The AC power having the predetermined transfer frequency is supplied from power supply units 600A, 600B, 600C to power transmission units 700A, 700B, 700C via filter circuits 610A, 610B, 610C. Each of power transmission units 700A, 700B, 700C and power reception unit 100 of vehicle 10 includes a coil and a capacitor, and is designed to resonate at the transfer frequency. Preferably, a Q factor indicating the intensity of resonance between power transmission units 700A, 700B, 700C and power reception unit 100 is more than or equal to 100.

When the AC power is supplied from power supply units 600A, 600B, 600C to power transmission units 700A, 700B, 700C, energy (electric power) moves from any of power transmission units 700A, 700B, 700C to power reception unit 100, through an electromagnetic field formed between the coil included in any of power transmission units 700A, 700B, 700C and the coil of power reception unit 100. Then, the energy (electric power) which has moved to power reception unit 100 is supplied to power storage device 300 via filter circuit 150 and rectification unit 200.

It should be noted that, although not shown in particular, insulating transformers may be provided between power transmission units 700A, 700B, 700C and power supply units 600A, 600B, 600C (for example, between power transmission units 700A, 700B, 700C and filter circuits 610A, 610B, 610C) in power transmission devices 20A, 20B, 20C. Further, also in vehicle 10, an insulating transformer may be provided between power reception unit 100 and rectification unit 200 (for example, between power reception unit 100 and filter circuit 150).

(Configuration of Power Reception Unit)

FIGS. 3 to 6 are views showing examples of the configuration of the resonance circuit constituting power reception unit 100 of vehicle 10. Power reception unit 100 is constituted by the resonance circuit shown in any of FIGS. 3 to 6.

Figure 3:
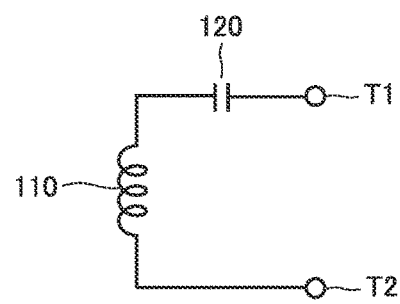
FIG. 3 is a view showing an example of a configuration of a resonance circuit constituting a power reception unit of the vehicle.

Referring to FIG. 3, power reception unit 100 includes a coil 110 and a capacitor 120. Capacitor 120 is connected in series with coil 110. That is, this power reception unit 100 is constituted by a resonance circuit having the S (Series) configuration.

Figure 4:
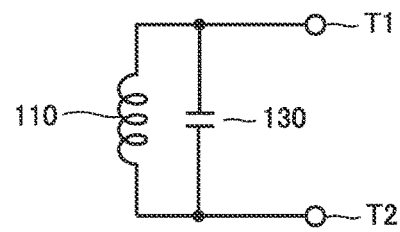
FIG. 4 is a view showing another example of the configuration of the resonance circuit constituting the power reception unit of the vehicle.

Referring to FIG. 4, power reception unit 100 in another example includes coil 110 and a capacitor 130. Capacitor 130 is connected in parallel with coil 110. That is, this power reception unit 100 is constituted by a resonance circuit having the P (Parallel) configuration.

Figure 5:
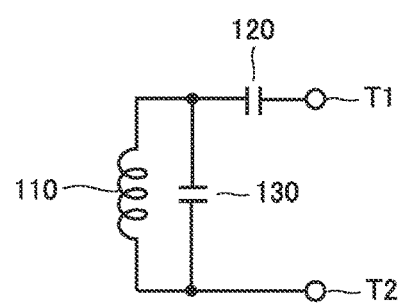
FIG. 5 is a view showing still another example of the configuration of the resonance circuit constituting the power reception unit of the vehicle.

Referring to FIG. 5, power reception unit 100 in still another example includes coil 110 and capacitors 120, 130. Capacitor 120 is connected in series with coil 110. Capacitor 130 is connected in parallel with coil 110 on a side closer to coil 110 than capacitor 120. That is, this power reception unit 100 is constituted by a resonance circuit having the SP configuration.

Figure 6:
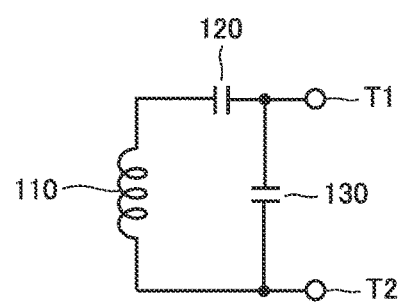
FIG. 6 is a view showing still another example of the configuration of the resonance circuit constituting the power reception unit of the vehicle.

Referring to FIG. 6, power reception unit 100 in still another example includes coil 110 and capacitors 120, 130. Capacitor 130 is connected in parallel with coil 110. Capacitor 120 is connected in series with coil 110 on a side closer to coil 110 than capacitor 130. That is, this power reception unit 100 is constituted by a resonance circuit having the PS configuration.

(Configuration of Power Transmission Unit)

Figure 7:
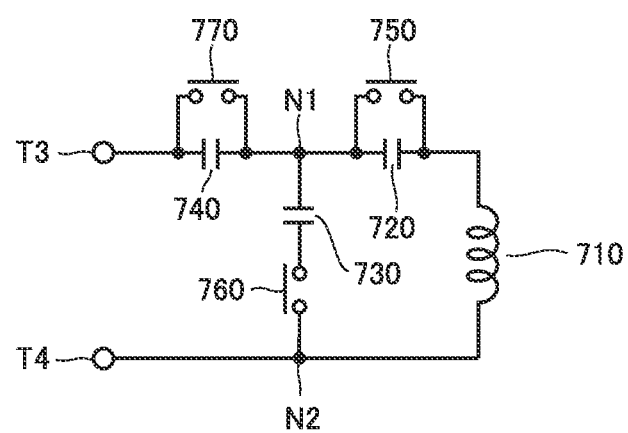
FIG. 7 is a view showing an example of a configuration of a power transmission unit of a power transmission device.

FIG. 7 is a view showing an example of a configuration of power transmission unit 700A of power transmission device 20A. It should be noted that, in the present embodiment, charging station 90 includes power transmission units 700B, 700C, and power transmission units 700B, 700C also have a configuration identical to that of power transmission unit 700A.

Referring to FIG. 7, power transmission unit 700A includes a coil 710, capacitors 720, 730, 740, and relays 750, 760, 770. Capacitor 720 is connected between one end of coil 710 and a node N1. Capacitor 730 is provided in parallel with coil 710, and one end of capacitor 730 is connected to node N1. Capacitor 740 is connected between node N1 and a terminal T3 connected to filter circuit 610A (FIG. 1). That is, capacitors 720, 740 are provided in series with coil 710, and capacitor 730 is provided in parallel with coil 710.

Relays 750, 770 are connected in parallel with capacitors 720, 740, respectively. Relay 760 is connected in series with capacitor 730. It should be noted that relay 760 may be provided between node N1 and capacitor 730. Relays 750, 760, 770 are controlled to be ON or OFF by power supply ECU 800 (FIG. 1).

With such a configuration, power transmission unit 700A can form a resonance circuit having any of the S configuration, the P configuration, the SP configuration, and the PS configuration. That is, a resonance circuit having the S configuration is formed by setting relays 750, 760, 770 to OFF, OFF, ON, respectively. Further, a resonance circuit having the P configuration is formed by setting all relays 750, 760, 770 to ON. Further, a resonance circuit having the SP configuration is formed by setting relays 750, 760, 770 to ON, ON, OFF, respectively. Further, a resonance circuit having the PS configuration is formed by setting relays 750, 760, 770 to OFF, ON, ON, respectively.

In the present embodiment, the information about the resonance circuit of power reception unit 100 (specifically, the type of the configuration of the resonance circuit) is transmitted from vehicle 10 to charging station 90. Then, a resonance circuit having a configuration identical to that of the resonance circuit of power reception unit 100 is formed by appropriately operating relays 750 to 770 in power transmission units 700A to 700C where no vehicle stops.

It should be noted that, although a resonance circuit of a different type is formed by switching the circuit configurations using relays 750 to 770 in each of power transmission units 700A to 700C in the present embodiment, each of power transmission units 700A to 700C may include resonance circuits having the S configuration, the P configuration, the SP configuration, and the PS configuration, and the resonance circuits themselves may be switchable.

(Procedure for Contactless Power Transfer)

Figure 8:
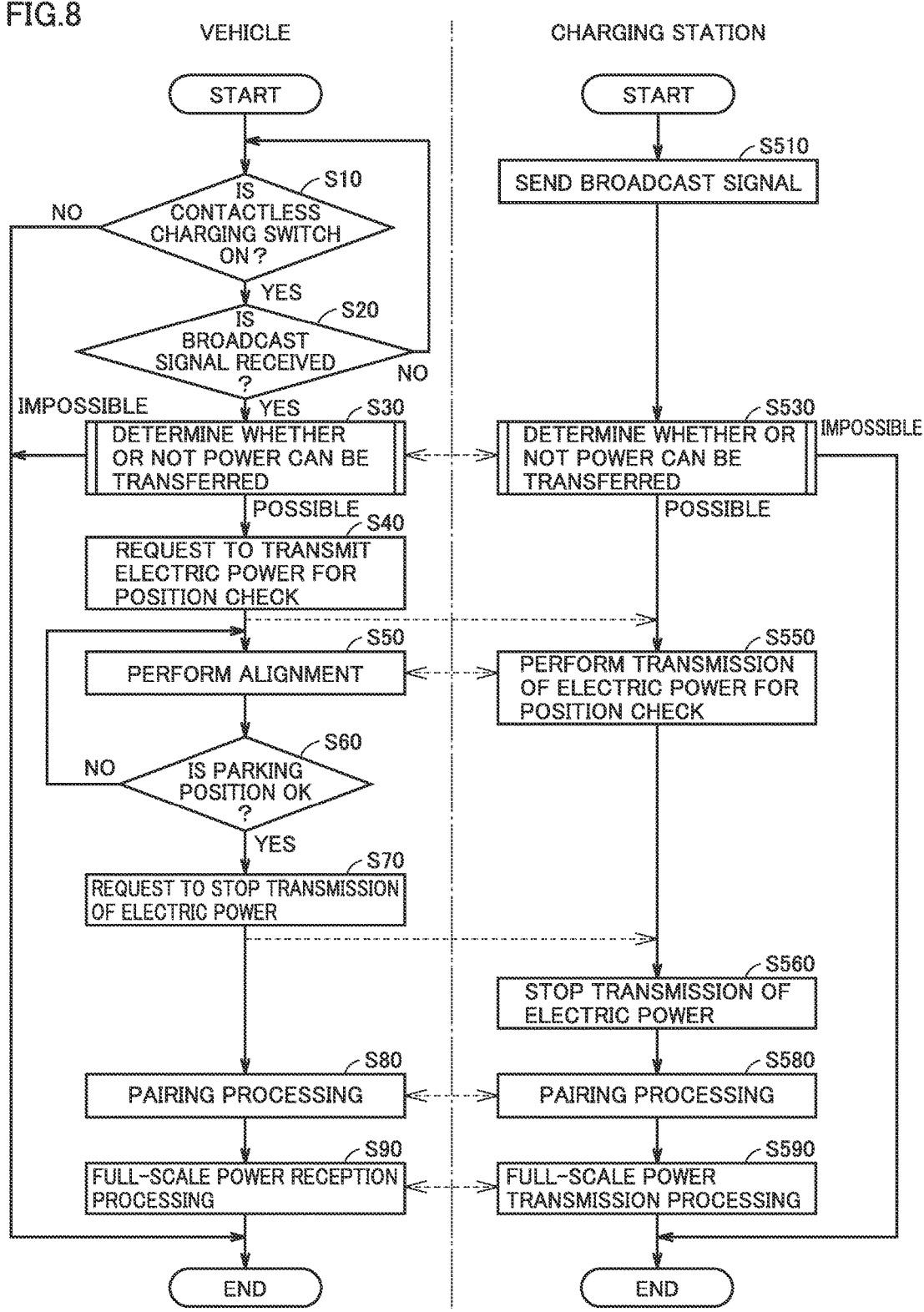
FIG. 8 is a flowchart for illustrating an outline of processing performed by the vehicle and the charging station when contactless power transfer is performed.

FIG. 8 is a flowchart for illustrating an outline of processing performed by vehicle 10 and charging station 90 when contactless power transfer is performed. FIG. 9 is a timing chart showing changes in transmitted power and received voltage changing in the course of the processing of FIG. 8.

Referring to FIGS. 1, 8, and 9, in charging station 90, when power supply ECU 800 determines that at least one of parking sections A to C is vacant based on outputs from sensors 21A to 21C, charging station 90 sends the broadcast signal informing that charging station 90 is in a condition where it can transmit electric power, to the surroundings (step S510).

In vehicle 10, vehicle ECU 500 determines whether or not contactless charging switch 530 is "ON" (step S10). Contactless charging switch 530 is in an "ON" state unless it is operated by the user, and is turned "OFF" by being operated by the user. When vehicle ECU 500 determines that contactless charging switch 530 is "OFF" (NO in step S10), vehicle ECU 500 terminates the processing without performing a series of subsequent steps.

When vehicle ECU 500 determines that contactless charging switch 530 is "ON" in step S10 (YES in step S10), vehicle ECU 500 determines whether or not the broadcast signal is received from charging station 90 (step S20). When the broadcast signal is not received (NO in step S20), the processing returns to step S10.

When the broadcast signal is received in vehicle 10 (YES in step S20), the information about the resonance circuit of power reception unit 100 is transmitted from vehicle 10 to charging station 90, and determination processing for determining whether or not power can be transferred from charging station 90 to vehicle 10 is performed in vehicle ECU 500 of vehicle 10 and power supply ECU 800 of charging station 90 (steps S30, S530). This determination processing will be described later in detail.

When it is determined that power cannot be transferred from charging station 90 to vehicle 10, the processing is terminated in vehicle 10 and charging station 90. On the other hand, when it is determined that power can be transferred from charging station 90 to vehicle 10, vehicle ECU 500 of vehicle 10 transmits a signal for requesting to output electric power for position check, to charging station 90 (step S40).

When the above request signal is received in charging station 90, power supply ECU 800 controls power supply units 600A to 600C such that the electric power for position check is output from a power transmission unit of a parking section where no vehicle stops (step S550). It should be noted that, in a case where sensors 21A to 21C are not provided, power supply ECU 800 cannot recognize in which parking section the vehicle is being parked. Accordingly, in this case, power supply ECU 800 controls power supply units 600A to 600C such that the electric power for position check is output from all of the power transmission units of the parking sections in which full-scale power transmission for charging power storage device 300 is not performed.

When the electric power for position check is received in vehicle 10, vehicle ECU 500 performs alignment by automatically or manually moving vehicle 10 based on the received voltage (step S50) (see time t1 in FIG. 9). At the time of the alignment, vehicle ECU 500 brings relay 202 into conduction to obtain received voltage VR generated across resistor 201 detected by voltage sensor 203. Since received voltage VR at the time of the alignment is lower than a received voltage at the time of the full-scale power transmission for charging power storage device 300 (charging voltage), relay 210 is turned OFF so as not be influenced by power storage device 300 at the time of voltage detection.

When received voltage VR exceeds a threshold TH, completion of the alignment is displayed on display unit 520. Thereafter, when the user presses a parking switch inside vehicle 10 and thereby it is determined that the parking position is OK (YES in step S60), vehicle ECU 500 transmits a signal for requesting to stop transmission of the electric power for position check, to charging station 90 (step S70) (see time t2 in FIG. 9).

When the above stop request signal is received in charging station 90, power supply ECU 800 stops transmission of the electric power for position check by power transmission device 20A, 20B, 20C (step 5560) (see time t3 in FIG. 9).

It should be noted that a transmitted voltage (output voltage from power transmission device 20A, 20B, 20C) is constant, whereas received voltage VR in vehicle 10 changes in accordance with the distance between the coil of power transmission device 20A, 20B, 20C and the coil of power reception device 140. Accordingly, the relation between received voltage VR and the difference in horizontal position between the center of gravity O1 of a core of the coil on the power transmission side and the center of gravity O2 of a core of the coil on the power reception side is measured beforehand, and received voltage VR for an acceptable value of the difference in horizontal position between the center of gravity O1 of the core and the center of gravity O2 of the core is set as threshold TH.

Next, vehicle ECU 500 and power supply ECU 800 perform pairing processing for identifying with which of power transmission devices 20A, 20B, 20C the alignment is performed (steps S80, S580). Power supply ECU 800 causes each power transmission device to have a different duration for which transmitted power is ON. That is, power transmission device 20A sets the transmitted power to ON for a time TA, power transmission device 20B sets the transmitted power to ON for a time TB, and power transmission device 20C sets the transmitted power to ON for a time TC (see time t4 in FIG. 9).

Then, vehicle ECU 500 informs power supply ECU 800 of a duration for which received power is ON. In the example of FIG. 2, power reception device 140 receives the transmitted power from power transmission device 20A. Vehicle ECU 500 informs power supply ECU 800 that the duration for which the received power is ON is TA. Thereby, power supply ECU 800 recognizes that the alignment is performed with power transmission device 20A. In step 5590, charging station 90 performs full-scale power transmission processing for charging power storage device 300 by a power transmission device with which the alignment is performed and for which identification by pairing is completed (see time t6 in FIG. 9). In the example of FIG. 2, power transmission device 20A performs the power transmission processing. On the other hand, in vehicle 10, full-scale power reception processing for charging power storage device 300 is performed by power reception device 140, and power storage device 300 is charged with the received power. Then, when charging of power storage device 300 is completed, the processing in vehicle 10 and charging station 90 is terminated.

(Determination of Whether or Not Power Can be Transferred)

Figure 10:
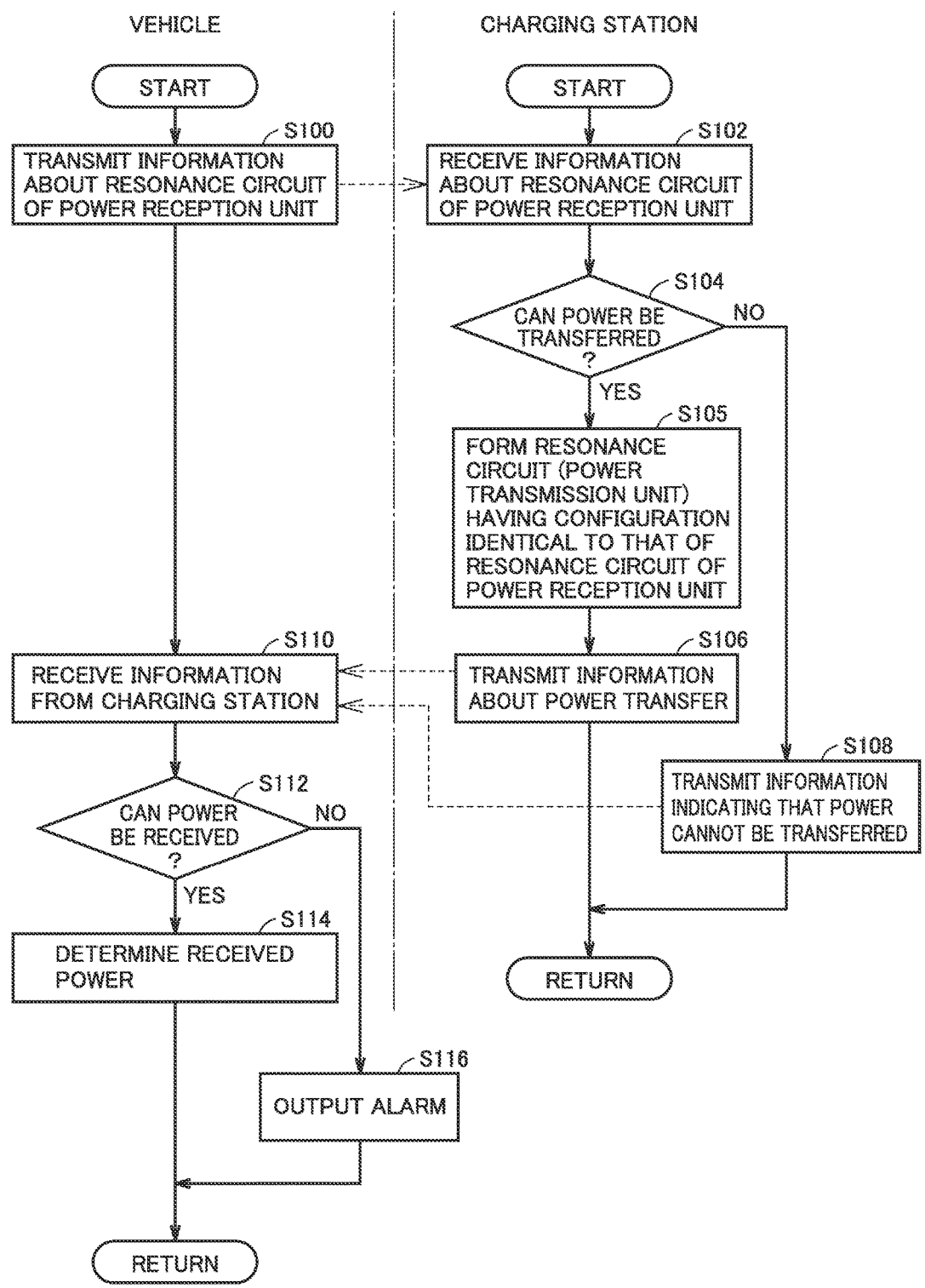
FIG. 10 is a flowchart illustrating processing for determination of whether or not power can be transferred, performed in steps S30 and S530 shown in FIG. 8.

FIG. 10 is a flowchart illustrating processing for determination of whether or not power can be transferred, performed in steps S30 and 5530 shown in FIG. 8. Referring to FIG. 10, vehicle ECU 500 transmits the information about the resonance circuit of power reception unit 100 to charging station 90 (step S100). This information about the resonance circuit at least includes information about which of the S configuration, the P configuration, the SP configuration, and the PS configuration the resonance circuit is constituted by, and may further include information about the capacity of capacitor 120 (130), the size of coil 110, and the like.

When the information about the resonance circuit of power reception unit 100 is received in charging station 90 (step S102), power supply ECU 800 determines whether or not power can be transferred from charging station 90 to vehicle 10, based on the received information (step S104). Specifically, whether or not power can be transferred from charging station 90 to vehicle 10 is determined based on whether or not a resonance circuit having a circuit configuration identical to that of the resonance circuit of power reception unit 100 can be formed in power transmission units 700A to 700C, and if such a resonance circuit can be formed, whether or not coil 110 of power reception unit 100 has an appropriate size, and the like.

When power supply ECU 800 determines in step S104 that power can be transferred from charging station 90 to vehicle 10 (YES in step S104), power supply ECU 800 controls relays 750 to 770 such that a resonance circuit having a circuit configuration identical to that of the resonance circuit of power reception unit 100 is formed in a power transmission unit of a parking section where no vehicle stops (step S105). Then, power supply ECU 800 transmits information about power transfer from charging station 90 to vehicle 10, to vehicle 10 (step S106). It should be noted that this information includes, for example, information about the range of electric power which can be output from charging station 90, and the like.

When power supply ECU 800 determines in step S104 that power cannot be transferred from charging station 90 to vehicle 10 (NO in step S104), power supply ECU 800 transmits information indicating that power cannot be transferred, to vehicle 10 (step S108).

When the information (the information about power transfer, or the information indicating that power cannot be transferred) from charging station 90 is received in vehicle 10 (step S110), vehicle ECU 500 determines whether or not power can be received from charging station 90, based on the received information (step S112). When vehicle ECU 500 determines that power can be received (YES in step S112), vehicle ECU 500 determines the magnitude of received power received from charging station 90 (step S114). When vehicle ECU 500 determines in step S112 that power cannot be received (NO in step S112), an alarm indicating that power cannot be received is output (step S116).

As described above, in the present embodiment, the information about the resonance circuit of power reception unit 100 is transmitted from vehicle 10 to charging station 90. Each of power transmission units 700A to 700C of charging station 90 can form a resonance circuit of a plurality of types (the S configuration, the P configuration, the SP configuration, the PS configuration), and a resonance circuit having a circuit configuration identical to that of the resonance circuit of power reception unit 100 is formed in a power transmission unit of a parking section where no vehicle stops, based on the information about the resonance circuit of power reception unit 100. That is, the power transmission unit of charging station 90 and power reception unit 100 of vehicle 10 have resonance circuits having an identical circuit configuration. Therefore, according to the present embodiment, it is possible to suppress impedance mismatching between charging station 90 and vehicle 10 due to the difference in the circuit configuration of the resonance circuit between power transmission units 700A to 700C and power reception unit 100.

[First Variation]

Although determination of whether or not power can be transferred is performed in charging station 90 in the above description as shown in FIG. 10, the determination may be performed in vehicle 10.

Figure 11:
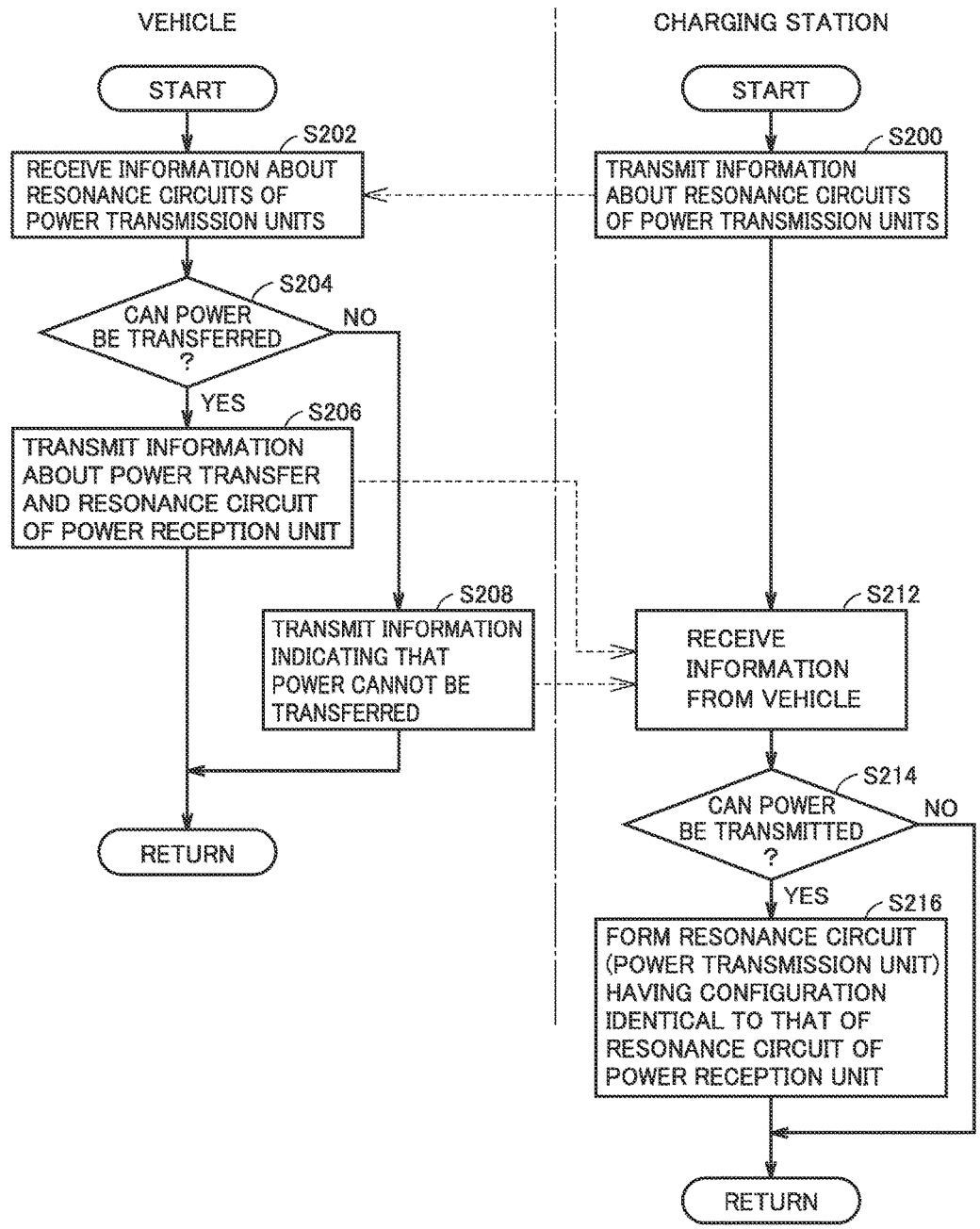
FIG. 11 is a flowchart illustrating processing for determination of whether or not power can be transferred in a first variation.

FIG. 11 is a flowchart illustrating processing for determination of whether or not power can be transferred in a first variation. It should be noted that this flowchart corresponds to FIG. 10, and the entire processing for power transfer is identical to the processing in the first embodiment shown in FIG. 8.

Referring to FIG. 11, in charging station 90, power supply ECU 800 transmits information about the resonance circuit of each of power transmission units 700A to 700C to vehicle 10 (step S200). It should be noted that this information at least includes information about the configuration of a resonance circuit which can be formed in each of power transmission units 700A to 700C, and may include information about the capacity of capacitors 720 to 740, the size of coil 710, and the like.

When the information about the resonance circuit of each of power transmission units 700A to 700C is received in vehicle 10 (step S202), vehicle ECU 500 determines whether or not power can be transferred from charging station 90 to vehicle 10, based on the received information (step S204). Specifically, whether or not power can be transferred from charging station 90 to vehicle 10 is determined based on whether or not a resonance circuit having a circuit configuration identical to that of the resonance circuit of power reception unit 100 can be formed in power transmission units 700A to 700C, and if such a resonance circuit can be formed, whether or not coil 710 of each of power transmission units 700A to 700C has an appropriate size, and the like.

When vehicle ECU 500 determines in step S204 that power can be transferred from charging station 90 to vehicle 10 (YES in step S204), vehicle ECU 500 transmits information about power transfer and information about the resonance circuit of power reception unit 100 to charging station 90 (step S206). The information about power transfer includes, for example, information about the range of electric power which can be received by vehicle 10, and the like. Further, the information about the resonance circuit of power reception unit 100 at least includes information about which of the S configuration, the P configuration, the SP configuration, and the PS configuration the resonance circuit is constituted by, and may further include information about the capacity of capacitor 120 (130), the size of coil 110, and the like.

When vehicle ECU 500 determines in step S204 that power cannot be transferred from charging station 90 to vehicle 10 (NO in step S204), vehicle ECU 500 transmits information indicating that power cannot be transferred, to charging station 90 (step S208).

When the information (the information about power transfer and the resonance circuit, or the information indicating that power cannot be transferred) from vehicle 10 is received in charging station 90 (step S212), power supply ECU 800 determines whether or not power can be transmitted to vehicle 10, based on the received information (step S214). When power supply ECU 800 determines that power can be transmitted (YES in step S214), power supply ECU 800 controls relays 750 to 770 such that a resonance circuit having a circuit configuration identical to that of the resonance circuit of power reception unit 100 is formed in a power transmission unit of a parking section where no vehicle stops (step S216). When power supply ECU 800 determines in step S214 that power cannot be transmitted, the processing is terminated without performing processing in step 5216.

[Second Variation]

A variation of the pairing processing is illustrated in a second variation.

FIG. 12 is a view for illustrating a variation of the pairing processing. Referring to FIG. 12, power supply ECU 800 causes each power transmission device to have a different cycle for switching ON and OFF of transmitted power. That is, power transmission device 20A switches ON and OFF of the transmitted power in a cycle of $\Delta TA$, power transmission device 20B switches ON and OFF of the transmitted power in a cycle of $\Delta TB$, and power transmission device 20C switches ON and OFF of the transmitted power in a cycle of $\Delta TC$ (see times t4 to t5 in FIG. 12).

Vehicle ECU 500 informs power supply ECU 800 of a cycle for switching ON and OFF of received power. In the example of FIG. 12, power reception device 140 receives the transmitted power from power transmission device 20A.

Vehicle ECU 500 informs power supply ECU 800 that the cycle for switching ON and OFF of the received power is ΔTA. Thereby, power supply ECU 800 recognizes that the alignment is performed with power transmission device 20A (see time t5 in FIG. 12).

Although the second variation is a variation in which pairing is performed using transmitted power, the method for the pairing processing is not limited thereto. Pairing can be performed using various techniques, and for example, pairing may be performed using an RFID (Radio Frequency IDentification) technique, by providing an RFID tag and an RFID reader to a vehicle and a power transmission unit, respectively.

In the first embodiment and the first and second variations thereof described above, power reception unit 100 of vehicle 10 has a resonance circuit having a certain configuration, and any of a plurality of resonance circuits can be selectively formed in each of power transmission units 700A to 700C of the charging station. As another variation, each of the power transmission units of the charging station has a resonance circuit having a certain configuration, and any of a plurality of resonance circuits can be selectively formed in the power reception unit of the vehicle, although not shown in particular.

Further, although a resonance circuit having a circuit configuration identical to that of the resonance circuit of power reception unit 100 is formed in a power transmission unit of charging station 90 in the embodiment and the variations described above, the circuit configuration of the power transmission unit may be different from the circuit configuration of power reception unit 100 as long as appropriate current-voltage characteristics can be obtained. For example, in a case where power reception unit 100 is constituted by a resonance circuit having the P configuration, a resonance circuit having the S configuration may be formed in the power transmission unit, and in a case where power reception unit 100 is constituted by a resonance circuit having the PS configuration, a resonance circuit having the SP configuration may be formed in the power transmission unit.

The embodiments disclosed herein are also intended to be implemented by being combined as appropriate. In addition, it should be understood that the embodiment disclosed herein is illustrative and non-restrictive in every respect. The scope of the present invention is defined by the scope of the claims, rather than the above description of the embodiment, and is intended to include any modifications within the scope and meaning equivalent to the scope of the claims.

REFERENCE SIGNS LIST

10: vehicle; 20A, 20B, 20C: power transmission device; 21A, 21B, 21C: sensor; 90: charging station; 100: power reception unit; 110, 710: coil; 120, 130, 720, 730, 740: capacitor; 140: power reception device; 150, 610A, 610B, 610C: filter circuit; 200: rectification unit; 201: resistor; 202, 210, 310, 750, 760, 770: relay; 203: voltage sensor; 300: power storage device; 400: motive power generation device; 500: vehicle ECU; 510, 810: communication unit; 520: display unit; 530: contactless charging switch; 600A, 600B, 600C: power supply unit; 700, 700B, 700C: power transmission unit; 800: power supply ECU; 900: external power source.

The invention claimed is:

1. A power transmission device, comprising:
a power transmission unit configured to contactlessly transmit electric power to a vehicle;
a communication device configured to communicate with the vehicle,
the vehicle including a resonance circuit for power reception configured to contactlessly receive the electric power output from the power transmission unit,
the power transmission unit being configured to be able to form a plurality of resonance circuits for power transmission having circuit configurations different from each other,
the communication device being configured to receive information about the resonance circuit for power reception from the vehicle; and
a control device configured to control the power transmission unit to form a resonance circuit in the power transmission unit based on the information from the vehicle received by the communication device,
the power transmission unit including a switching circuit for selectively forming a resonance circuit for power transmission having any of an S configuration, a P configuration, an SP configuration, and a PS configuration,
each of the resonance circuit for power reception and the plural kinds of resonance circuit for power transmission including a coil and a capacitor,
in the S configuration, a capacitor is connected in series with the coil,
in the P configuration, a capacitor is connected in parallel with the coil,
in the SP configuration, another capacitor is connected in series with a circuit having the P configuration, and
in the PS configuration, another capacitor is connected in parallel with a circuit having the S configuration.

2. A power transmission device, comprising:
a power transmission unit configured to contactlessly transmit electric power to a vehicle;
a communication device configured to communicate with the vehicle,
the vehicle including a resonance circuit for power reception configured to contactlessly receive the electric power output from the power transmission unit, wherein:
the power transmission unit being configured to be able to form plural kinds of resonance circuits having circuit configurations different from each other,
the communication device being configured to receive information about the resonance circuit for power reception from the vehicle; and
a control device configured to control the power transmission unit to form one of the resonance circuits in the power transmission unit based on the information from the vehicle received by the communication device,
the control device controlling the power transmission unit to form the one of the resonance circuits for power transmission in the power transmission unit based on the information from the vehicle received by the communication device, the one of the resonance circuits having a circuit configuration identical to that of the resonance circuit for power reception,
each of the resonance circuit for power reception and the plural kinds of resonance circuit for power transmission including a coil and a capacitor, and
the information being information indicating a connection state of the coil and the capacitor of the resonance circuit for power reception,
wherein the power transmission unit includes a switching circuit for selectively forming a resonance circuit for power transmission having any of an S configuration, a P configuration, an SP configuration, and a PS configuration, in the S configuration, a capacitor is connected in series with the coil, in the P configuration, a capacitor is connected in parallel with the coil, in the SP configuration, another capacitor is connected in series with a circuit having the P configuration, and in the PS configuration, another capacitor is connected in parallel with a circuit having the S configuration.

3. A contactless power transfer system, comprising:
a charging station; and
a vehicle configured to contactlessly receive electric power from the charging station,
the charging station including:
   a power transmission unit for contactlessly transmitting the electric power to the vehicle; and
   a first communication device configured to communicate with the vehicle, the vehicle including:
   a resonance circuit for power reception configured to contactlessly receive the electric power output from the power transmission unit; and
   a second communication device configured to communicate with the charging station, wherein:
the power transmission unit being configured to be able to form a plurality of resonance circuits for power transmission having circuit configurations different from each other,
the second communication device transmitting information about the resonance circuit for power reception to the first communication device,
the charging station further including a control device configured to control the power transmission unit, when the information is received by the first communication device, to form a resonance circuit in the power transmission unit based on the received information,
the power transmission unit including a switching circuit for selectively forming a resonance circuit for power transmission having any of an S configuration, a P configuration, an SP configuration, and a PS configuration,
each of the resonance circuit for power reception and the plural kinds of resonance circuit for power transmission including a coil and a capacitor,
in the S configuration, a capacitor is connected in series with the coil,
in the P configuration, a capacitor is connected in parallel with the coil,
in the SP configuration, another capacitor is connected in series with a circuit having the P configuration, and
in the PS configuration, another capacitor is connected in parallel with a circuit having the S configuration.

4. A contactless power transfer system, comprising:
a charging station; and
a vehicle configured to contactlessly receive electric power from the charging station,
the charging station including:
   a power transmission unit for contactlessly transmitting the electric power to the vehicle; and
   a first communication device configured to communicate with the vehicle, the vehicle including:
   a resonance circuit for power reception configured to contactlessly receive the electric power output from the power transmission unit; and
   a second communication device configured to communicate with the charging station, wherein:
the power transmission unit being configured to be able to form plural kinds of resonance circuits having circuit configurations different from each other,
the second communication device transmitting information about the resonance circuit for power reception to the first communication device,
the charging station further including a control device configured to control the power transmission unit, when the information is received by the first communication device, to form one of the resonance circuits in the power transmission unit based on the received information,
the control device controlling the power transmission unit, when the information is received by the first communication device, to form the one of the resonance circuits for power transmission in the power transmission unit, the one of the resonance circuits having a circuit configuration identical to that of the resonance circuit for power reception,
each of the resonance circuit for power reception and the plural kinds of resonance circuit for power transmission including a coil and a capacitor, and
the information being information indicating a connection state of the coil and the capacitor of the resonance circuit for power reception,
wherein the power transmission unit includes a switching circuit for selectively forming a resonance circuit for power transmission having any of an S configuration, a P configuration, an SP configuration, and a PS configuration,
in the S configuration, a capacitor is connected in series with the coil,
in the P configuration, a capacitor is connected in parallel with the coil,
in the SP configuration, another capacitor is connected in series with a circuit having the P configuration, and
in the PS configuration, another capacitor is connected in parallel with a circuit having the S configuration.

* * * * *